US012720240B2

(12) United States Patent
Murakowski

(10) Patent No.: US 12,720,240 B2
(45) Date of Patent: Aug. 25, 2026

(54) MULTI-CORE ASYMMETRIC STar-ROUTING SWITCH AND METHOD FOR OPTICAL ROUTING (MASTR SWITCH AND MOR)

(71) Applicant: Phase Sensitive Innovations, Inc., Newark, DE (US)

(72) Inventor: Janusz Murakowski, Bear, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 288 days.

(21) Appl. No.: 18/660,215

(22) Filed: May 9, 2024

(65) Prior Publication Data

US 2024/0381010 A1 Nov. 14, 2024

Related U.S. Application Data

(60) Provisional application No. 63/464,954, filed on May 9, 2023.

(51) Int. Cl.
*H04Q 11/00* (2006.01)

(52) U.S. Cl.
CPC . *H04Q 11/0005* (2013.01); *H04Q 2011/0035* (2013.01); *H04Q 2011/0052* (2013.01)

(58) Field of Classification Search
CPC .... G02B 6/3546; G02B 6/3596; G02B 6/356; H04Q 11/0005
See application file for complete search history.

(56) References Cited

U.S. PATENT DOCUMENTS 6,222,955 B1 * 4/2001 Lagali .................. G02F 1/3136 385/20
11,152,700 B2 10/2021 Shi et al.
11,855,692 B2 12/2023 Murakowski et al.
2009/0169148 A1 * 7/2009 Doerr ................ H04B 10/5053 385/2
2010/0196005 A1 * 8/2010 Wada ..................... H04K 1/006 385/27
2021/0257729 A1 8/2021 Murakowski et al.

* cited by examiner

*Primary Examiner* — Michael P Mooney
(74) *Attorney, Agent, or Firm* — Muir Patent Law, PLLC

(57) ABSTRACT

An optical switch includes M switch input waveguides, M being an integer greater than 1; N switch output waveguides, N being an integer greater than M; a plurality of input-waveguide cores coupled to the M switch input waveguides; a plurality of input phase shifters respectively coupled to the plurality of input-waveguide cores; a plurality of output-waveguide cores coupled to the N switch output waveguides; a plurality of output phase shifters respectively coupled to the plurality of output-waveguide cores; an input aperture at which the plurality of input-waveguide cores coupled to the M input waveguides terminate; an output aperture at which the plurality of output-waveguide cores coupled to the N output waveguides terminate; and an interference region between the input aperture and the output aperture. Light from the M switch input waveguides can be routed to switch output waveguides depending on settings of the plurality of input phase shifters and the plurality of output phase shifters.

18 Claims, 15 Drawing Sheets

MULTI-CORE ASYMMETRIC STar-ROUTING SWITCH AND METHOD FOR OPTICAL ROUTING (MASTR SWITCH AND MOR)

RELATED APPLICATIONS

This application is a non-provisional application of Provisional Application No. 63/464,954 filed May 9, 2023, the entire contents of which are hereby incorporated by reference.

TECHNICAL FIELD

This disclosure describes an architecture of an optical, non-blocking M-by-N switch that may be realized in a photonic integrated circuit (PIC).

BACKGROUND

When using photonically-enabled phased arrays for communication, with free-space or integrated optics to form RF beams in the optical domain, it is desirable to arbitrarily route the optical signals between multiple inputs and multiple outputs. For example, in a transmitting (TX) array, an input signal at port 1 may be routed to any of the ports 1 through N that generate the respective one of 1-through-N RF beams transmitted by the array. It is generally anticipated that the number of beams a phased array is capable of forming may be larger, often considerably larger, than the number of active users served in its vicinity. Therefore, for SWAP-C (size, weight, and power requirement, plus cost) considerations, it may be desirable to have the number of electronic data paths (considerably) smaller than the number of possible beams and to rely on optical switching or routing to direct the small number of optical beams to form an arbitrary configuration of RF beams. Details of forming RF beams based on optical signal may be found, e.g., in U.S. Pat. No. 11,152,700, U.S. Patent Pub. No. 2021/0257729 and U.S. patent application Ser. No. 17/894,072 filed on Mar. 24, 2022, the contents of each of which being hereby incorporated by reference in its entirety.

For example, consider a phased array capable of forming 100 orthogonal RF beams and assume that the number of active users to be served by this array never exceeds 10. In this case, it may be preferred to build a system that supports 10 electronic data paths and generates 10 modulated optical beams. The 10 optical beams then enter a 10-by-100 switch that allows each of the 10 inputs to be directed to any of the 100 outputs simultaneously ($100!/90!=6.3\times10^{19}$ possible configurations in total). The 100 optical output ports of the switch are 'hard wired' to the input of an optical processor that performs Fourier transform and sends the result to the photo-diodes coupled to the transmitting antennas of the phased array.

In the example above, rather than build 100 electronic+photonic data paths and having 90 or more of them sit idle at any given time, only 10 such data paths are required, which saves on the system SwaP (size, weight, and power requirement). The optical switch then sends the data carried by the 10 data paths to 10 of the 100 RF beams that are directed to the positions of the 10 users. As the users move, the respective RF beams are (de) activated to follow them.

A similar situation occurs in the RX array. In this case, N users may be in the path of any of the M beams that the phased array may form. Using the numbers from the example above, up to 10 users may be present in the area served by a phased array capable of forming 100 beams. Rather than have 100 electronic data paths behind the RX phased array, only 10 would be needed if a 100-by-10 optical switch were implemented as part of the system.

There exist several technologies that implement optical switching. In a photonic integrated circuit (PIC), switching is typically obtained by biasing the arms of a Mach-Zehnder (MZ) interferometer to direct incoming light to one of two ports. This way a 2×2 switch is realized. To obtain a larger switch, e.g. N×N, multiple 2×2 are interconnected in a cascaded network. On the other hand, free-space optical switches may rely on MEMS mirrors that deflect light input and redirect it to the desired output. These architectures offer M×N switching in a single device, which is not a PIC. Other devices may use MOEMS (micro-opto-electro-mechanic systems) with integrated waveguides that are shifted by applying an electric field to direct a single input to one of several outputs.

SUMMARY

A switch according to example embodiments allows the number of inputs M in an optical, non-blocking M-by-N switch to differ from the number of outputs N. For M≤N, each of the M inputs may be simultaneously directed to any of the N outputs in a non-blocking, 1-to-1 fashion. For M≥N, a maximum of N input signals may be simultaneously directed to any of the N outputs in a non-blocking, 1-to-1 fashion. The switch relies on multi-core waveguides for transmitting the optical beams, on phase shifters for defining optical phase fronts, and on star couplers for directing the beams from input to output ports. The switch may be described as a Multi-core Asymmetric STar-Routing (MASTR) switch.

BRIEF DESCRIPTION OF THE DRAWINGS

For a more complete understanding of this disclosure, and the advantages thereof, reference is now made to the following descriptions taken in conjunction with the accompanying drawings, in which.

Figure 3:
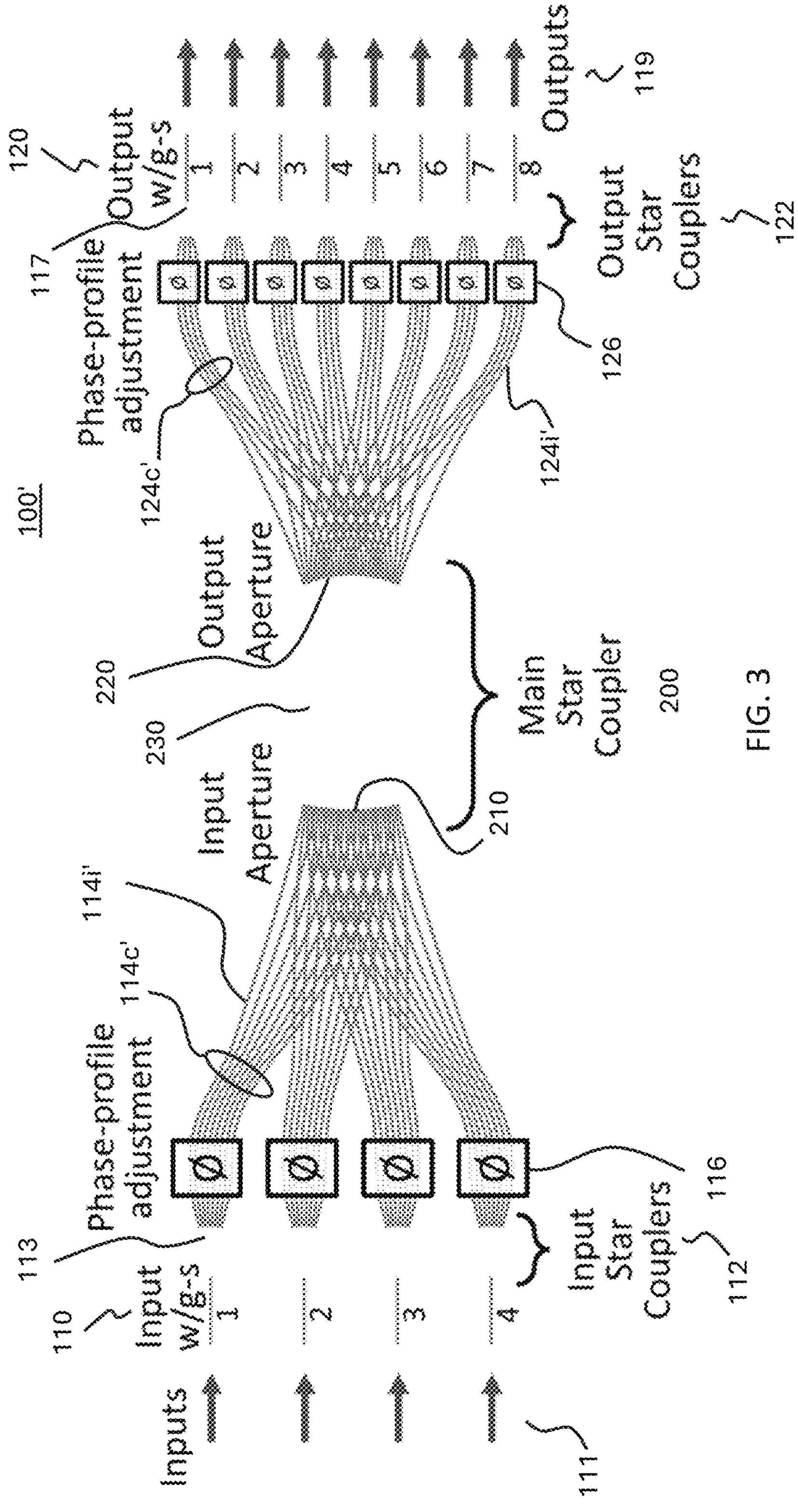
FIG. 3 shows an example optical switch, according to another example embodiment.
Figure 4A:
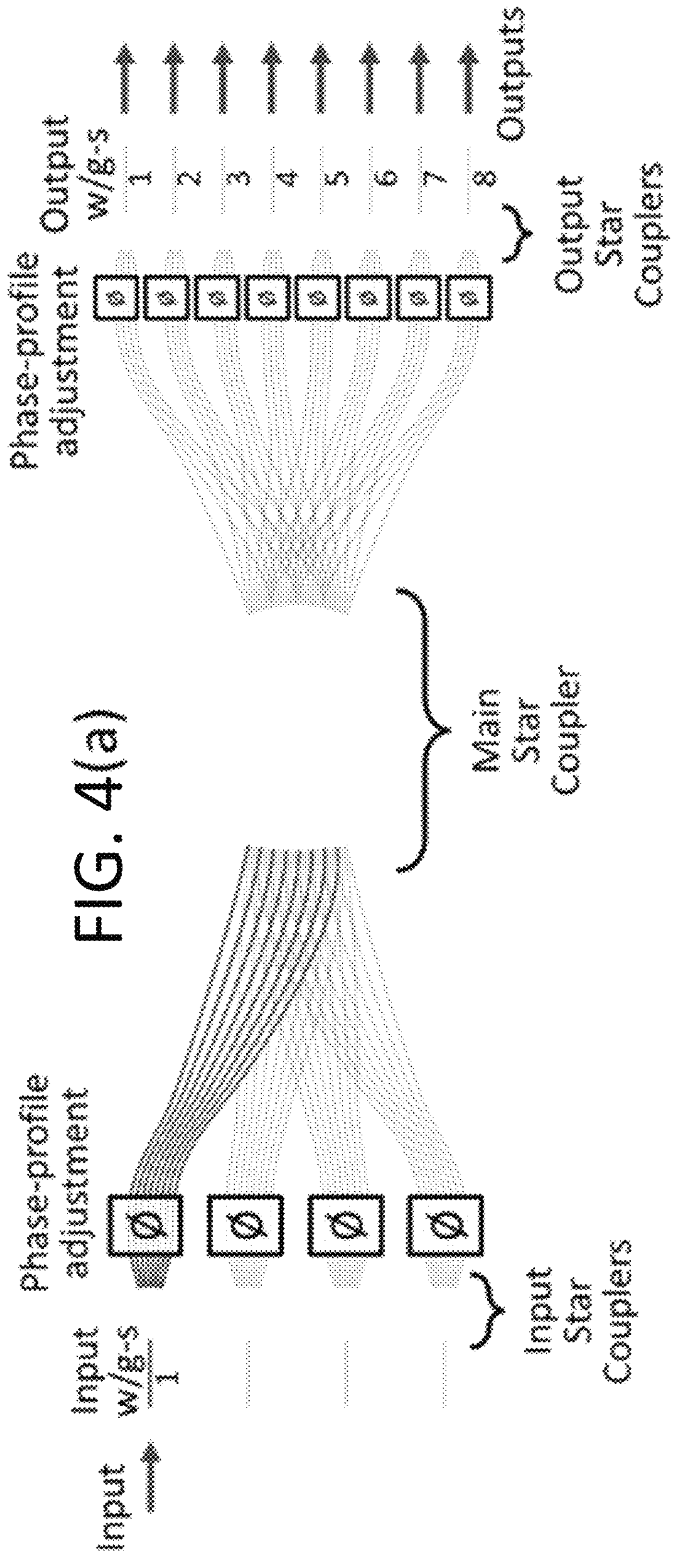
Figure 4B:
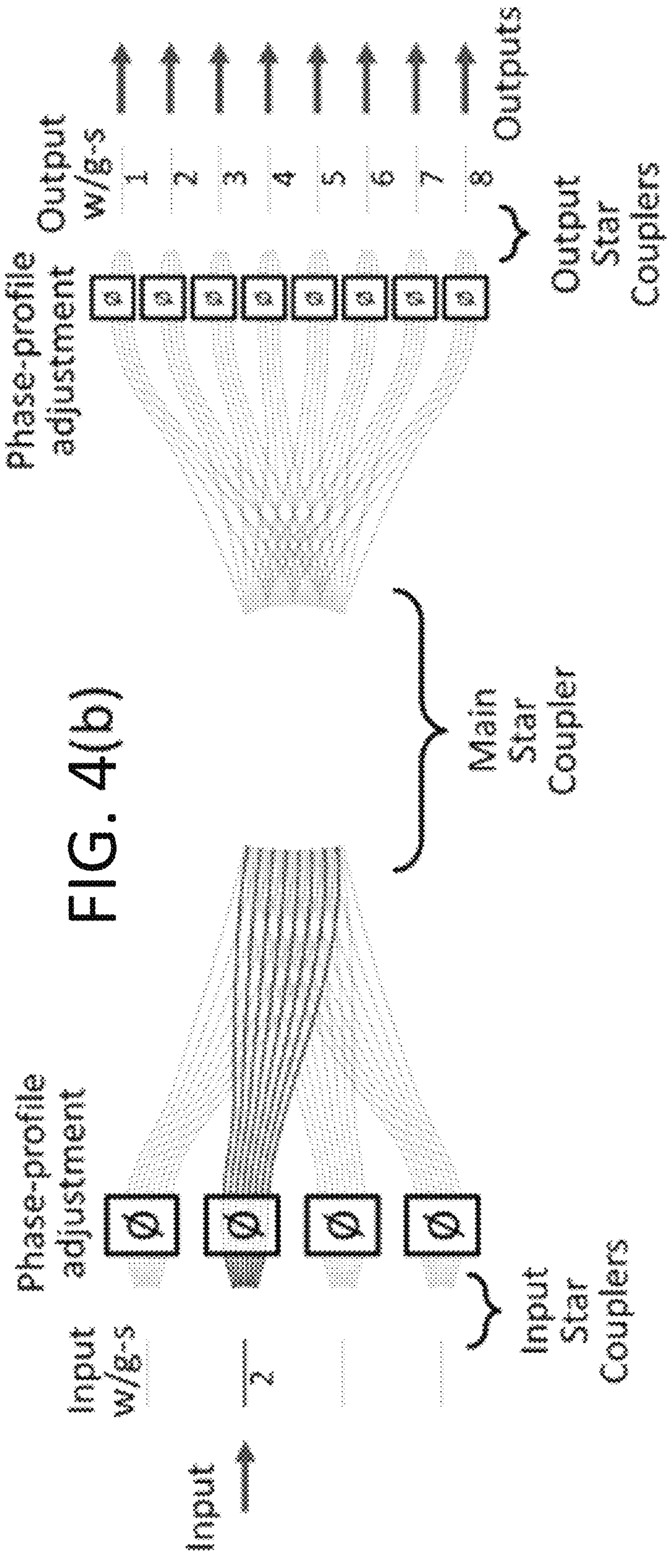
Figure 4C:
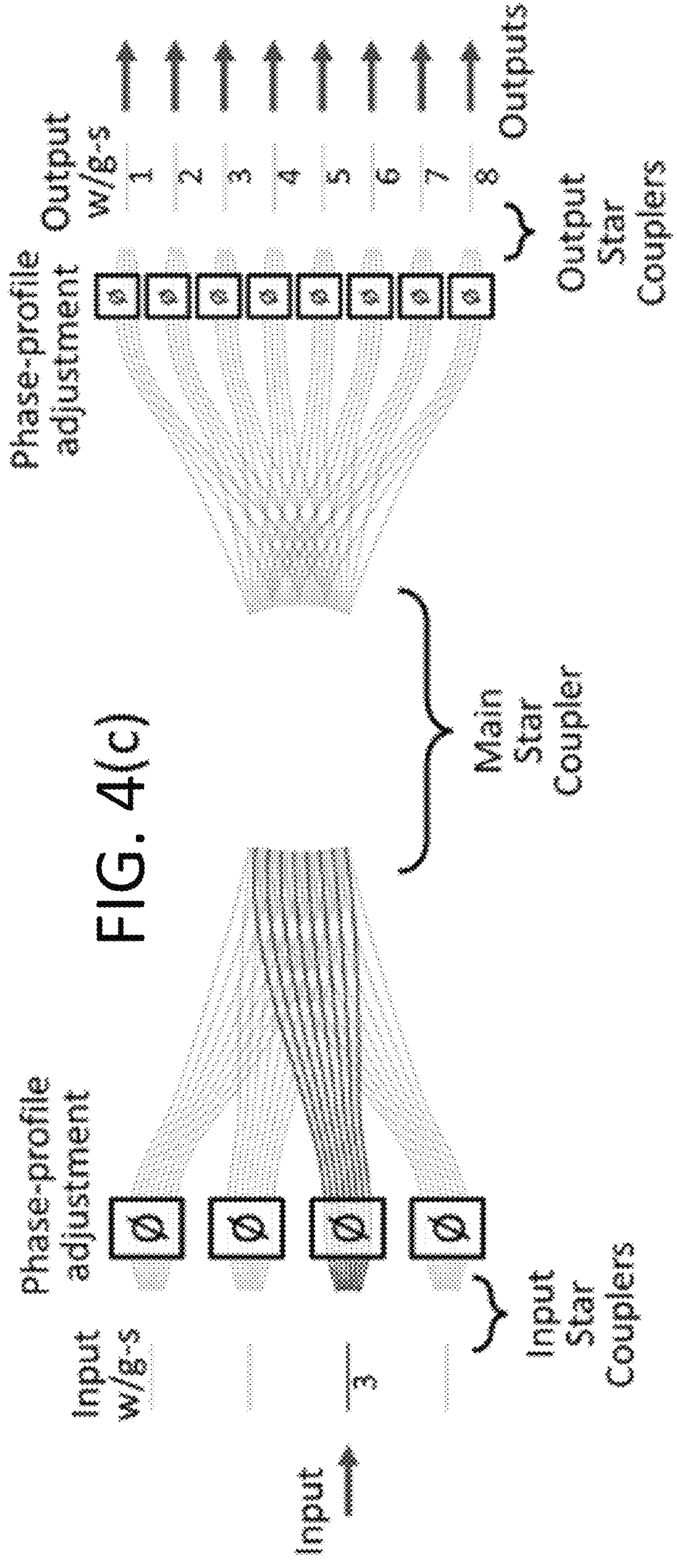
Figure 4D:
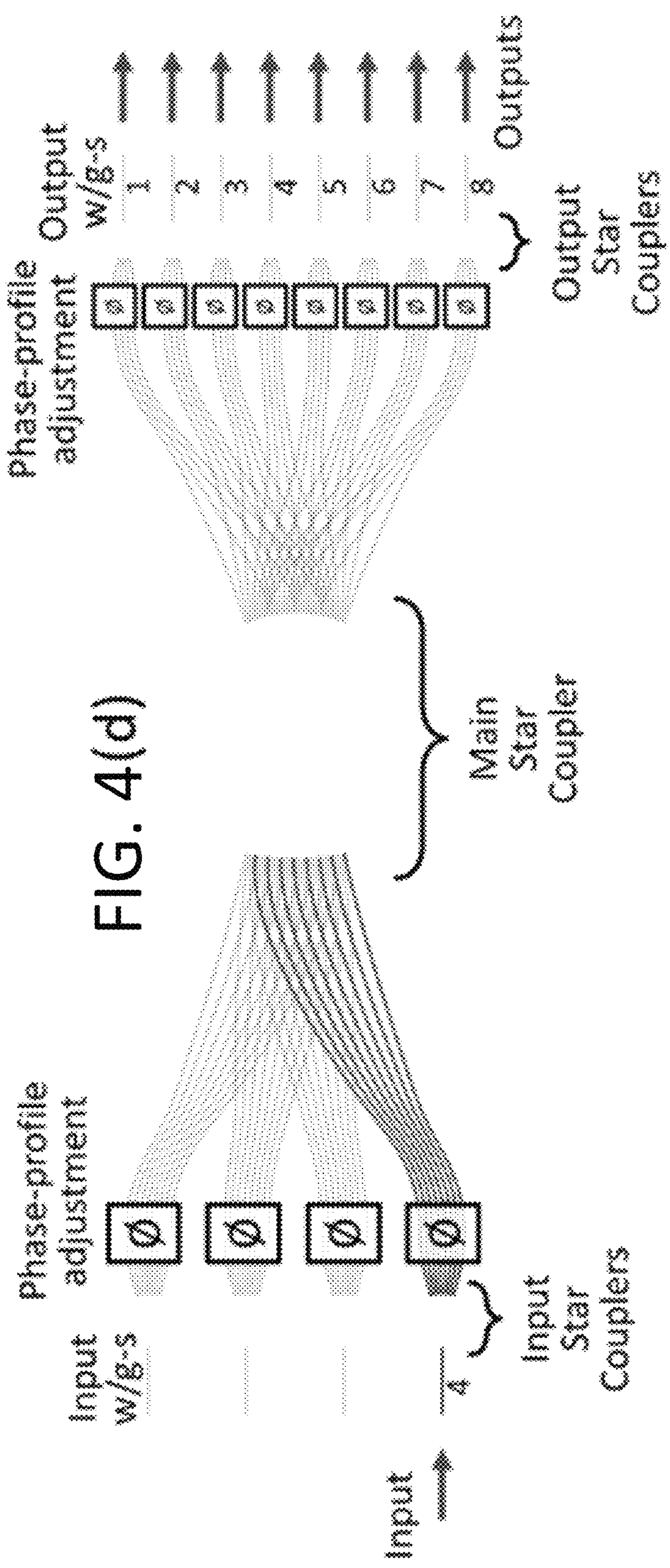
Figure 5A:
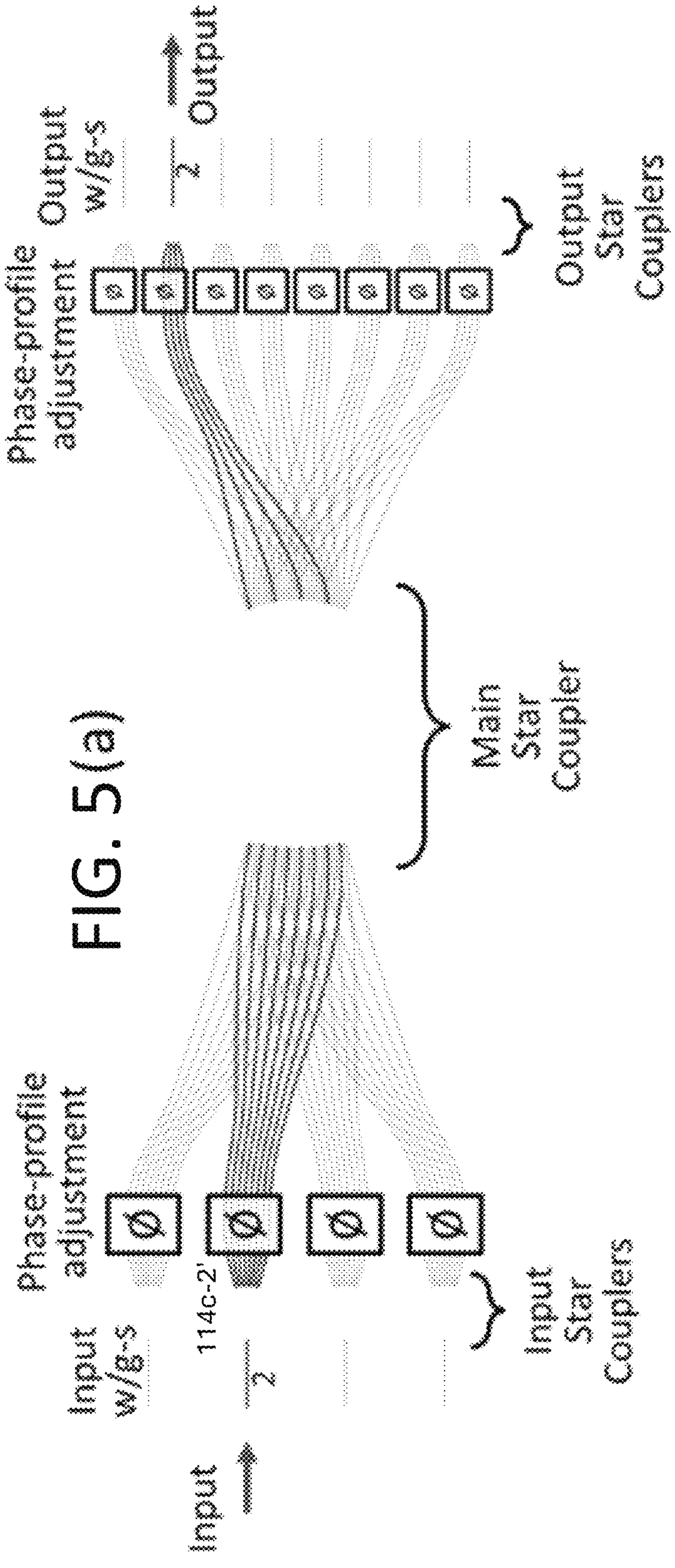
Figure 5B:
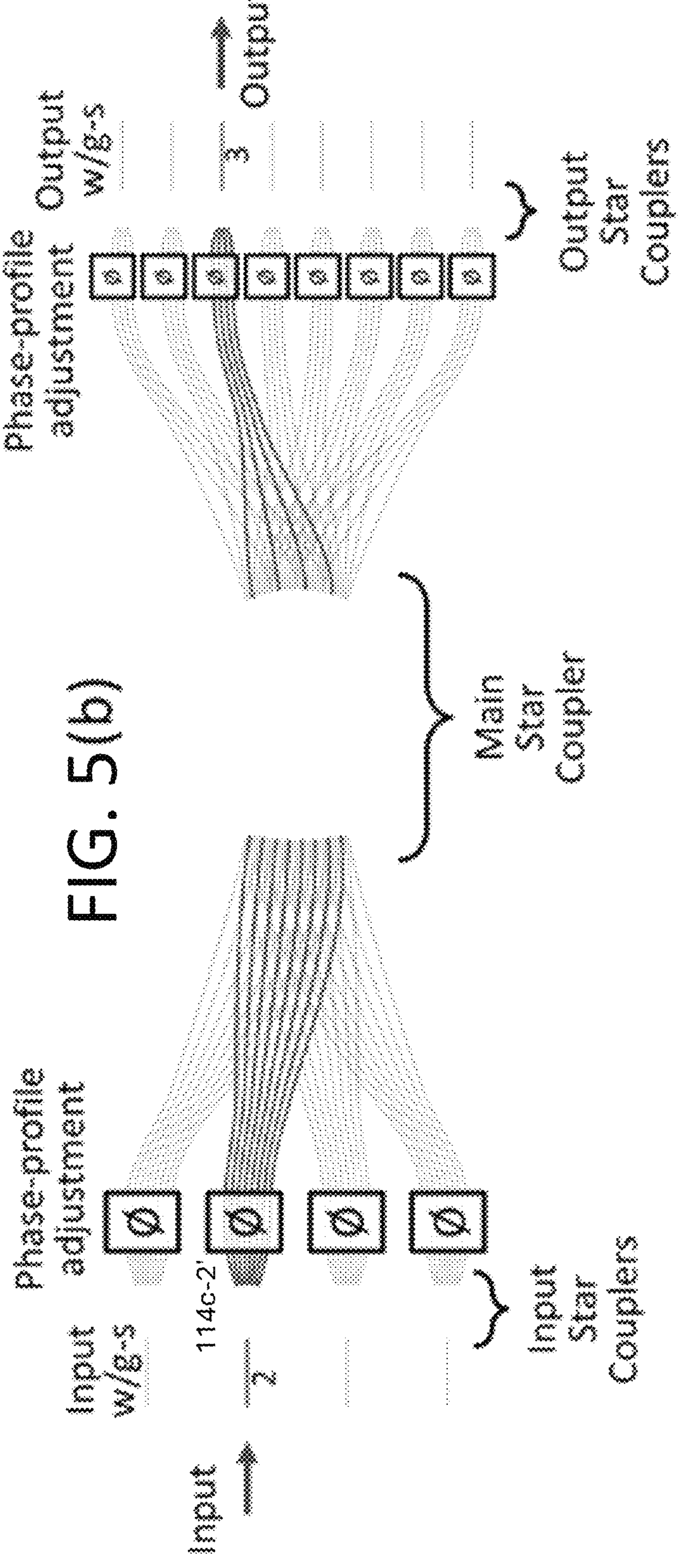
Figure 5C:
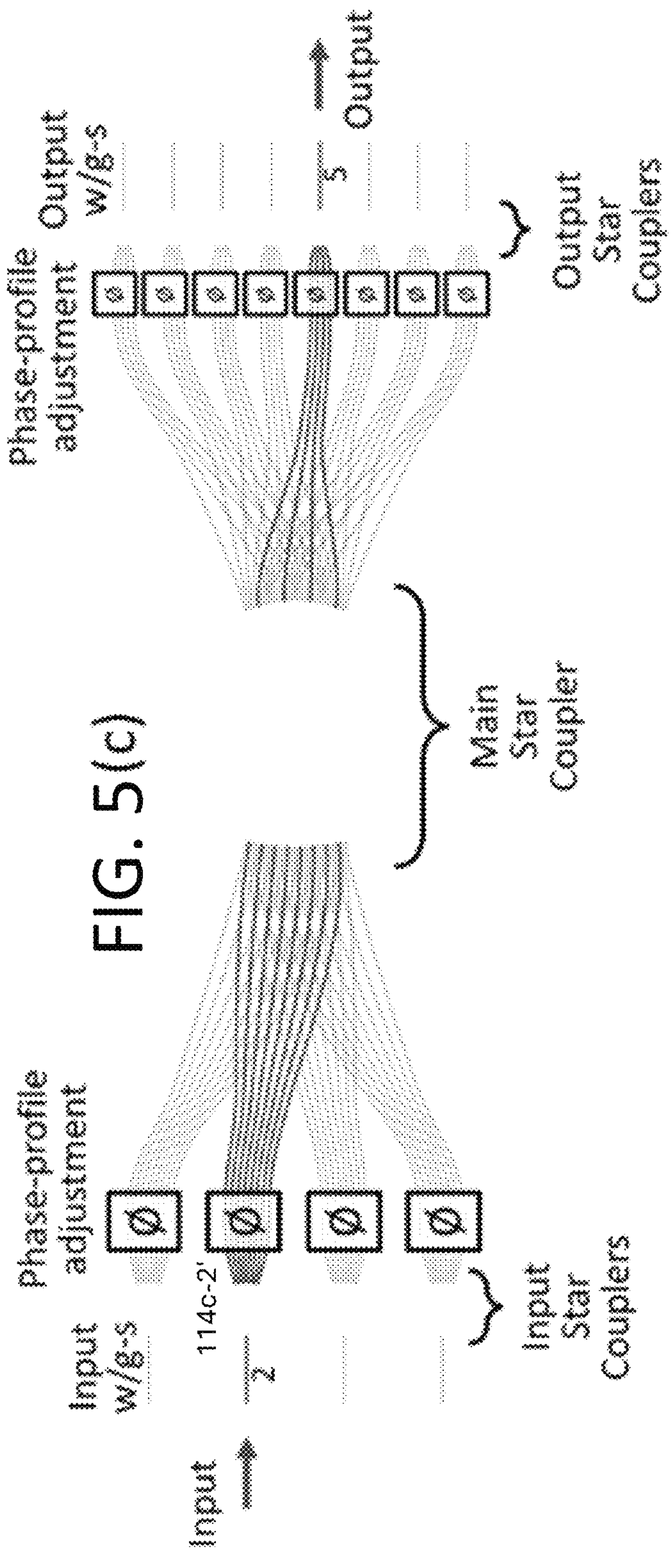
Figure 5D:
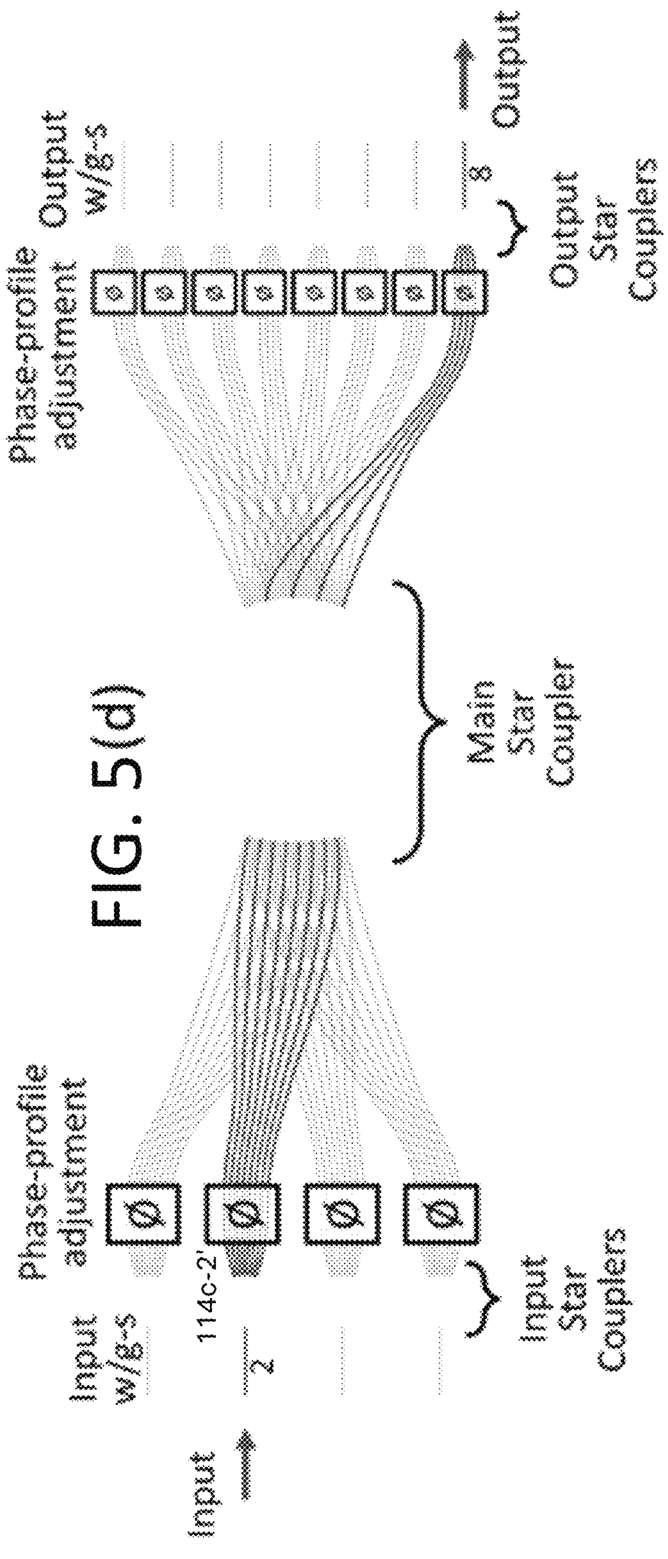
Figure 6:
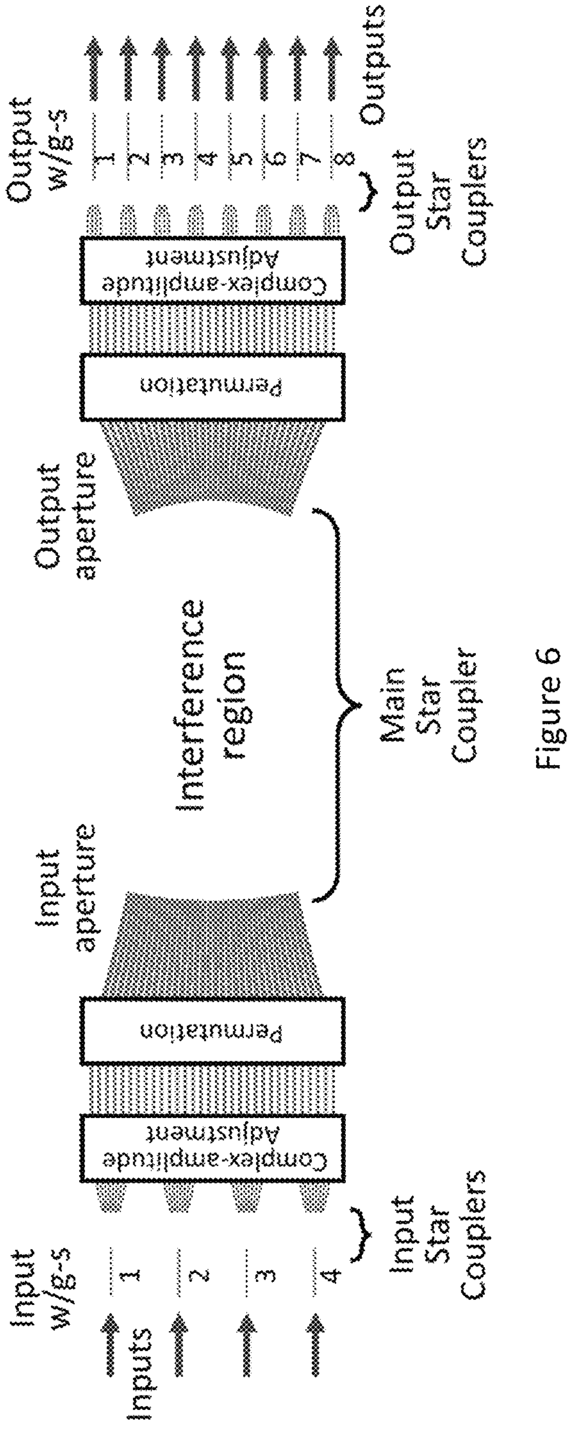
Figure 7:
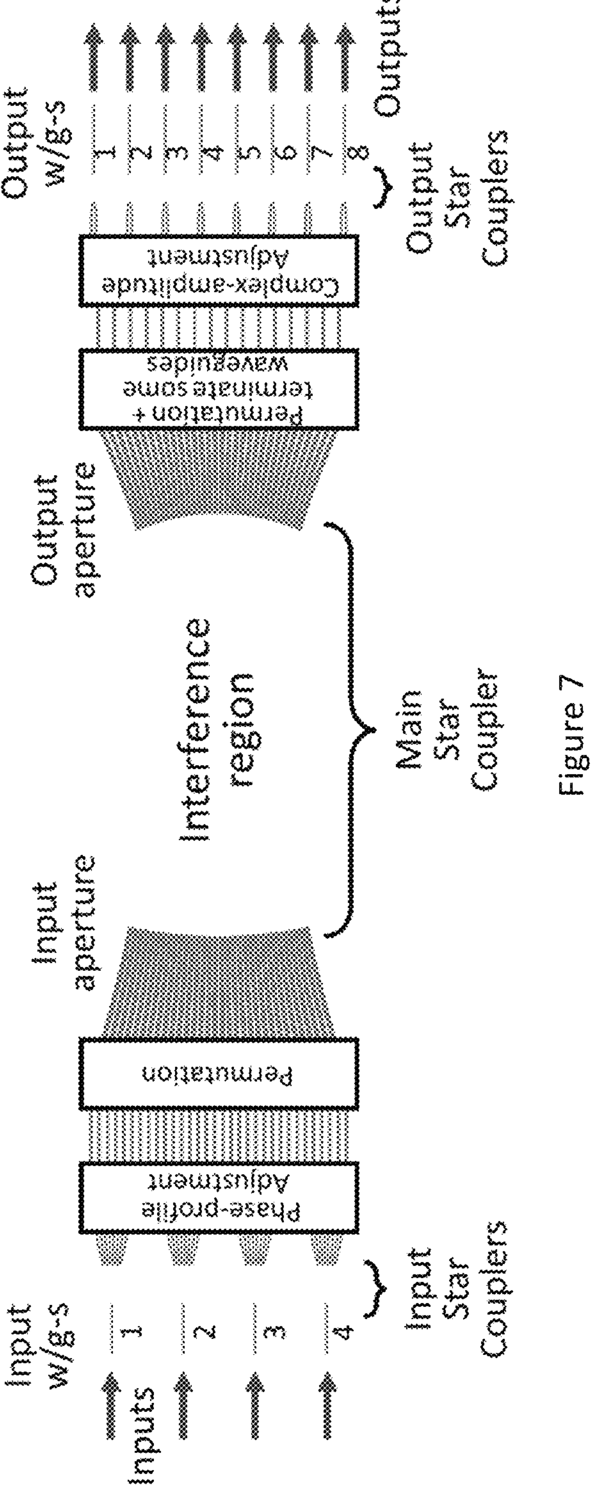

FIGS. ***4a*-*4d* show routing examples using the optical switch of FIG. 3**, according to an example embodiment;

FIGS. ***5a*-*5d* show routing examples using the optical switch of FIG. 3**, according to an example embodiment;

FIG. 6 shows a general configuration of an optical switch, according to example embodiments;

FIG. 7 shows an alternative general configuration of an optical switch, according to example embodiments.

DETAILED DESCRIPTION

The present disclosure now will be described more fully hereinafter with reference to the accompanying drawings, in which various exemplary implementations are shown. The invention may, however, be embodied in many different forms and should not be construed as limited to the exemplary implementations set forth herein. These example implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impractical to list every possible variation for every feature described herein. The language of the claims should be referenced in determining the requirements of the invention.

Figure 1:
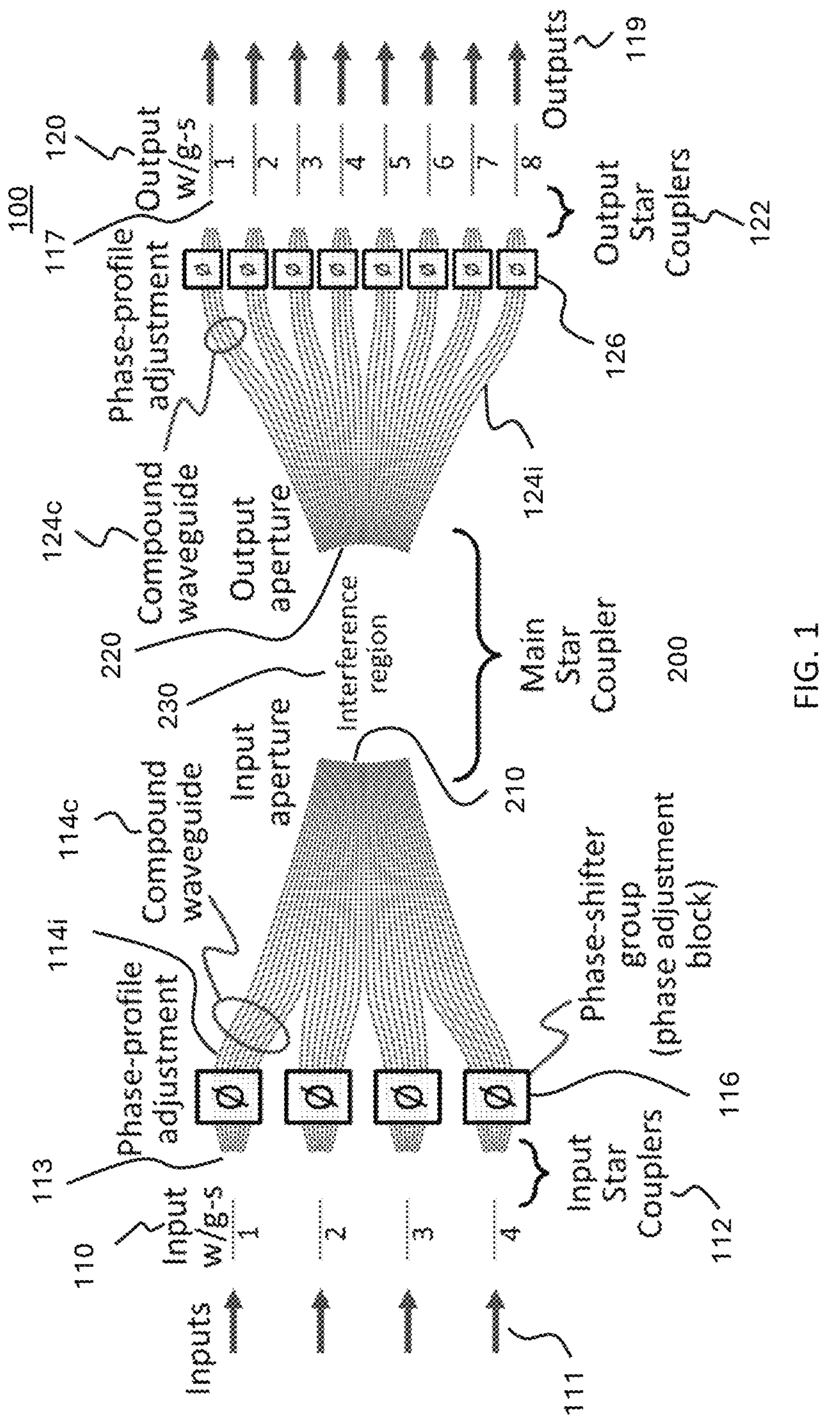
FIG. 1 shows an example optical switch, according to example embodiments.

FIG. 1. shows an example MASTR switch, described generally as an optical switch 100, for routing a plurality of optical input signals to a plurality of output paths. The optical switch 100 has a plurality of input waveguides 110, a plurality of input star couplers 112, a plurality of input-waveguide cores 114*i*, a plurality of input phase shifters 116, a plurality of output waveguides 120, a plurality of output star couplers 122, a plurality of output-waveguide cores 124*i*, a plurality of output phase shifters 126, and a main star coupler 200.

Each input waveguide 110, also described as an initial input waveguide or switch input waveguide, is configured to receive an input light beam 111, for example received via an optical fiber or other optical transmission medium, and to guide the light beam from an input end to an output end. The input light beams 111 may be, for example modulated light beams carrying information (e.g., data) and having a particular frequency, amplitude, and phase. Each input light beam 111 may convey an optical signal used, for example, for communication or for another purpose. For example, each input light beam 111 may be formed using a laser, a diode, or other light source. Each input waveguide 110, as well as the various waveguide-cores described herein, may be formed of a material transparent at the wavelength of the input light beam, such as for example silicon dioxide, silicon nitride, silicon, indium phosphide, gallium arsenide, or and organic compound such as polymethyl methacrylate, polyimide, or other dielectric material, and may be positioned to receive the input light beam focused at the input end (also described as the entry end) of the waveguide. In one embodiment, the total number of input waveguides equals M, where M is a positive integer, which receive M respective input light beams. Therefore, the optical switch 100 may include M optical inputs.

The output end (also described as an exit end) of each input waveguide may terminate at and output light to a corresponding star coupler 112. Therefore, M input waveguides 110 may be coupled to M corresponding input star couplers 112. As described herein, a "terminal end" of a waveguide may refer to any end of the waveguide where the waveguide terminates, and may refer to an input end where light is received or an output end where light is output.

Each waveguide 110 conveys light to the input of a respective star coupler 112. Upon leaving waveguide 110, light spreads to illuminate the output aperture of star coupler 112 and couples to the cores 114*i* of a respective compound input waveguide 114*c*. As a result, the light signal in input light beam 111 is split among the cores of a respective compound input waveguide 114*c*. Notably, this splitting of light among multiple cores may be accomplished by various means other than a star coupler. Such light-splitting means are known, understood, and implemented in the art. For example, a cascade of directional couplers may be used for this purpose. Other means include a cascade of Y splitters. Yet other means include a multi-mode interference (MMI) splitter.

A plurality of input-waveguide cores 114*i*, also described as secondary input waveguides, forms a respective compound input waveguide 114*c*; the entry ends of the input-waveguide cores 114*i* that constitute the respective compound input waveguide 114*c* form the output apertures of the respective input star coupler 112. Each input-waveguide core 114*i* may function as a waveguide for a particular light beam input at an entry end, to guide the light beam to the exit end. For example, each star coupler 112 may be coupled to a group of N input-waveguide cores 114*i* that form a compound input waveguide 114*c*. M compound input waveguides 114*c* may correspond to the M input waveguides 110 and the M star couplers 112. It should be noted that terms such as "initial," "secondary," "first," "second," "third," etc., may be used simply as labels of certain elements, steps, etc., to distinguish such elements, steps, etc. from one another. Terms that are not described using "initial," "secondary," "first," "second," etc., in the specification, may still be referred to as "initial," "secondary," "first," "second," etc. in a claim. In addition, a term that is referenced with a particular ordinal number (e.g., "first" in a particular claim) may be described elsewhere with a different ordinal number (e.g., "second" in the specification or another claim).

A plurality of input phase shifters 116 are respectively coupled to the plurality of input-waveguide cores 114*i*. For example, an input phase shifter 116 may be place between two portions of each input-waveguide core 114*i* (e.g., between an input end and an output end). Each input phase shifter 116 may be configured to shift the phase of light passing through the input-waveguide core 114*i*. For example, each input phase shifter 116 may be formed of a material whose index of refraction can be changed, such that light passing through the input phase shifter 116 experiences different delay, which changes the phase of light at the output. Examples of phase shifters include electro-optic phase shifters that depend on electro-optic materials such as lithium niobate, which has a variable index of refraction that can be adjusted by the application of an electric field, and thermo-optic phase shifters such as silicon, which has a variable index of refraction that can be adjusted by the application of heat. For example, a selectable voltage or current can be applied by a controller via a circuit, that is either connected to an electric-field generator or to a heater, which thereby adjusts the index of refraction of the input phase shifter 116 to adjust the phase of the input light beam passing through the core input waveguide 114*i*. In some embodiments, an input phase shifter 116 may be a portion of the respective input-waveguide core 114*i* that can have a voltage, current, electric field, heat, or other stimulus applied thereto to change the index of refraction of that portion.

Different phase-shifting approaches may be used in silicon-photonics technology. Phase shifting by carrier-depletion adjustment minimizes the dissipation of (electrical) power. However, such phase shifters are relatively large and subject to optical loss. On the other hand, thermal phase shifting (e.g., thermo-optic phase shifting), which takes small amount of real estate and is practically lossless for optics, suffers from heat-dissipation that is exacerbated by the potentially large number of phase shifters required for the operation of the switch. Other options for on-chip phase shifting include micro-electro-mechanical systems (MEMS) that adjust optical phase by physically shifting waveguides with applied voltage, or the use of liquid crystals that change refractive index as a result of applied electric field.

The phases of a group of N input light beams 113 passing through N input-waveguide cores **114*i* of each group of input-waveguide cores 114*i* (e.g., each compound input waveguide 114*c*, also described as an N-core compound waveguide) may be adjusted by a respective input phase shifter group to cause the input light beams to have a phase profile after passing through the input phase shifters 116. For example, a phase profile refers to a selected relationship between the light beams passing through the different input-waveguide cores 114*i*, such as an incrementally adjusted (e.g., delayed) phase between a series of adjacent input-waveguide cores 114*i***. The phases can be set/adjusted based on a user selection or otherwise externally generated selection of phase profile settings, and as described in more detail later, the phase profile can be set to cause a group of light beams exiting a compound input waveguide to be directed in a particular direction, or more generally, can be set to cause a group of light beams exiting any group of input-waveguide cores to have a particular light profile (e.g., light beam direction, light pattern) that can later be received and directed to an output light path.

Main star coupler 200 may include an input aperture 210, an output aperture 220, and an interference region 230. A star coupler is a structure that comprises an input aperture, and output aperture, and free propagation region (interference region) in between. The input and output apertures typically consist of the terminations (terminal ends) of one or more waveguides. The input and output apertures of the star coupler typically follow concave curves directed toward each other, as viewed from a top-down view. The curves may be segments of circles (e.g., to have an arc shape). The input and output apertures, as well as the input-waveguide cores **114*i* and output-waveguide cores 124*i*, and input waveguides 110, output waveguides 120, and main star coupler 200** may all be on the same plane (e.g., horizontal plane). The role of the curvature in star couplers in general is as follows: (1) Curvature on the input aperture provides for focusing light on the waveguide terminations of the output aperture; (2) Curvature on the output aperture provides for capturing light (originating at the waveguide termination of the input aperture) with well-determined or desirable phase relations between the different waveguides, or waveguide cores, of the output aperture. These relations may be preferably flat (identical phases) or blazed (phase differs by substantially the same amount in adjacent waveguides).

Output ends of the input-waveguide cores **114*i* may terminate at the input aperture 210. Because there may be M compound input waveguides 114*c*, each having N input-waveguide cores 114*i*, there may be a total of M×N input-waveguide cores 114*i* terminating at the input aperture 210 of the main star coupler 200. The output terminal ends of the input-waveguide cores 114*i* may be positioned in a particular arrangement to launch light into the interference region 230, wherein the exiting light beams exhibit desired characteristics due to interference in the interference region 230. These particular arrangements will be described in more detail below. As shown in the embodiment of FIG. 1, the terminal ends of input-waveguide cores 114*i* that make up a compound input waveguide 114*c* are positioned to be adjacent to each other and form output apertures of input star couplers 112**.

Once the input light beams from the input-waveguide cores **114*i* pass through the input aperture 210, they enter the interference region 230 of the main star coupler 200. The interference region 230 may also be described as a free-propagation region. In some embodiments, the main star coupler 200 may be formed of a transparent material, e.g., the same material that the cores of the compound waveguide are made from, which allows light to propagate freely, in a laterally unguided manner. Therefore, light beams passing through the interference region 230 may interfere with other light beams, resulting in a light having a light profile, or interference profile, such as a light pattern or light beam direction having certain characteristics. For example, the interference may cause certain light beams to have a phase wavefront that travels in a particular selected direction to reach a particular location on the output aperture 220, or may cause certain light beams to create an interference pattern that has peaks at certain locations on the output aperture 220**. Further details about these different interference scenarios will be described below.

The output aperture 220 is an aperture, through which light exiting the interference region 230 passes, or onto which the light exiting the interference region 230 is incident, and may correspond to the arrangement of output-waveguide core **124*i* terminal ends. Therefore, the output aperture 220 may collect the light passing through the interference region 230. The terminal ends of the output-waveguide core 124*i*** (e.g., the entry ends) may be arranged at a particular angle and position in relation to each other to allow for light to be captured according to the various embodiments described herein.

The output-waveguide cores **124*i*, also described as secondary output waveguides 124*i* are formed of a similar or the same material and have a similar or the same structure as the input-waveguide cores 114*i*, so details of their makeup are limited to differences from the input-waveguide cores 114*i* for the sake of brevity. The output-waveguide cores 124*i* may be grouped into groups, such as compound output waveguides 124*c* (e.g., M-core compound waveguides) as shown in FIG. 1. In some embodiments, the number of groups may be the same as N (i.e., the number of input-waveguide cores 114*i* coupled to each input waveguide 110), and so light exiting the main star coupler 200 and entering the output-waveguide cores 124*i* can be directed through any, or some, or all of N channels. However embodiments are not limited to this example. Each group of output waveguides (e.g., each compound output waveguide 124*c*) may include the same number of output-waveguide cores 124*i*** as the M input light beams.

Each output-waveguide core **124*i* is coupled to a respective output phase shifter 126. Output phase shifters 126 may be formed of the same materials and configured to operate in the same manner for shifting phase as the input phase shifters 116. Output phase shifters 126 may be configured to work in a complimentary way with respect to the input phase shifters 116. For example, a set of phase-shifted light beams entering a group of the output-waveguide cores 124*i*, such as a compound output waveguide 124*c*, may have a phase profile. The phase profile may match or correspond to the phase profile of the light beams passing through the input-waveguide cores 114*i* after being shifted by phase shifters 116**. Additional details regarding these matching phase profiles will be described below.

Accordingly, light beams passing through the output-waveguide cores **124*i* of a particular group of output-waveguide cores, such as a compound output waveguide 124*c*, may be flattened (e.g., straightened, or adjusted to be in phase), by a corresponding group of phase shifters 126**.

Output star couplers 122 may receive the phase-shifted light beams that have passed through the output phase shifters 126 and have reached the terminal end of the output-waveguide cores **124*i*, and may focus the light to an entry end of the output waveguides 120. The role of the output star couplers 122 is to combine light from multiple output-waveguide cores 124***i* of a compound output waveguide 124*c* in a single output waveguide 120. This functionality is illustrated in FIG. 1 as relying on output star couplers 122. However, other light-combining structures may be employed to achieve this functionality. For example, a cascade of Y combiners may be used for this purpose. In other embodiments, a cascade of directional couplers may be used. In yet other embodiments MMI combiners may be used. Combinations of such structures may also be used to combine light from multiple cores in a single output waveguide.

Output waveguides 120, also described as final output waveguides or switch output waveguides, may be formed of a similar or the same material as input waveguides 110, and may have the same or similar construction, and so details thereof will be omitted for brevity. Light beams output from the exit ends of the output waveguides 120 are described as output light beams, and are output from the optical switch 100.

In one embodiment, the number of output light paths may be the same as the number of input-waveguide cores 114*i* in each group of input-waveguide cores 114*i*, e.g., in each compound input waveguide 114*c*. So in the embodiment of FIG. 1, the number of output light paths is 8, which is also the number of output star couplers 122, compound output waveguides 124*c*, and input-waveguide cores 114*i* (e.g., N) in each compound input waveguide 114*c*. In this manner, depending on the construction of the optical switch, a desired number of input light beams can be routed to a desired number of output light paths, and the number of input light beams and output light paths can have an asymmetric relationship (e.g., different number of input light beams as output light paths).

In general, to select an output light path (e.g., output channel or output route) for a given input light beam, the input phase shifters 116 and output phase shifters 126 can be set to result in a particular phase profile for a group of light beams exiting a group of input-waveguide cores 114*i* (e.g., a first compound input waveguide), which causes light in the interference region to have different interference characteristics. Light being received at the output aperture 220 and entering the output-waveguide cores 124*i* can then be further phase-shifted by output phase shifters 126 coupled to a particular group of output-waveguide cores 124*i* (e.g., a first compound output waveguide) to result in a light beam that properly focuses on a desired output waveguide 120.

Figure 2A:
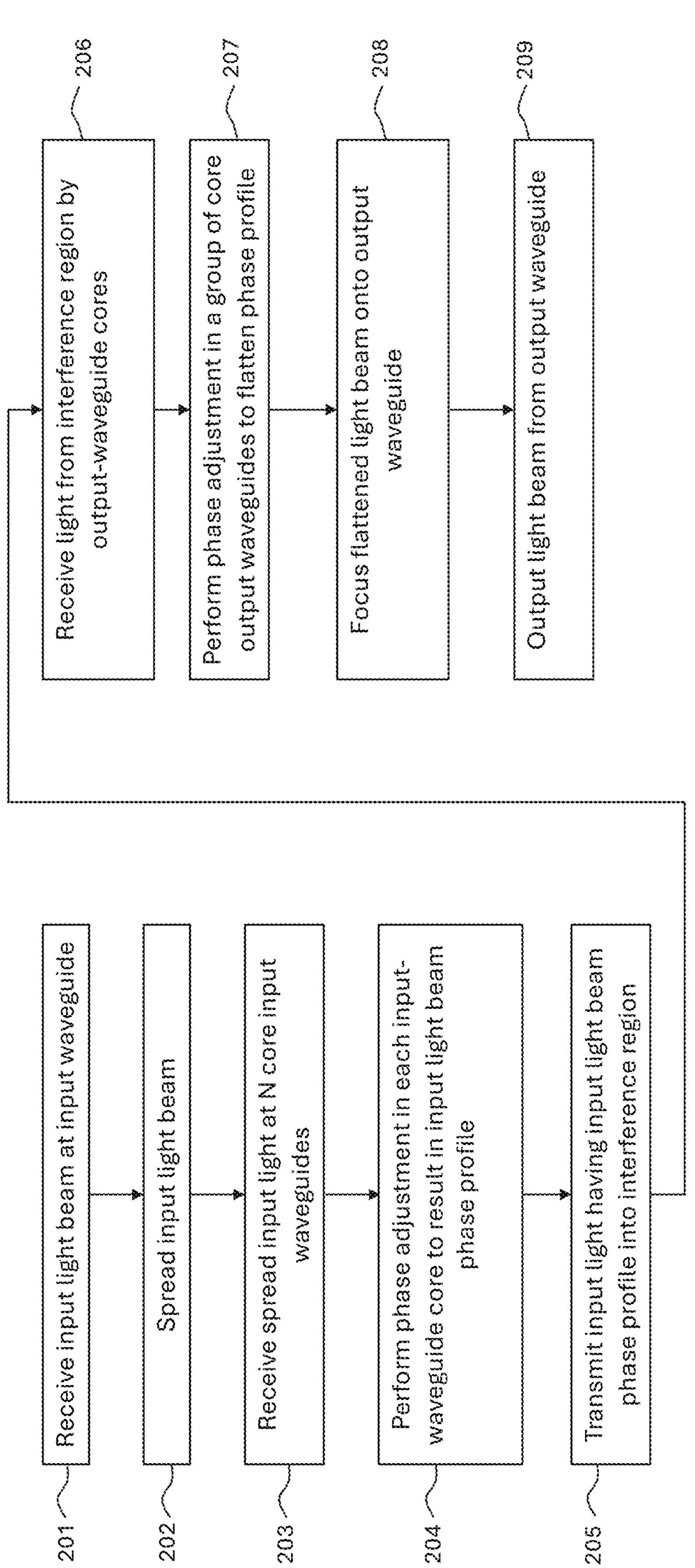
FIG. 2A shows a method of routing optical signals, according to an example embodiment.
Figure 2B:
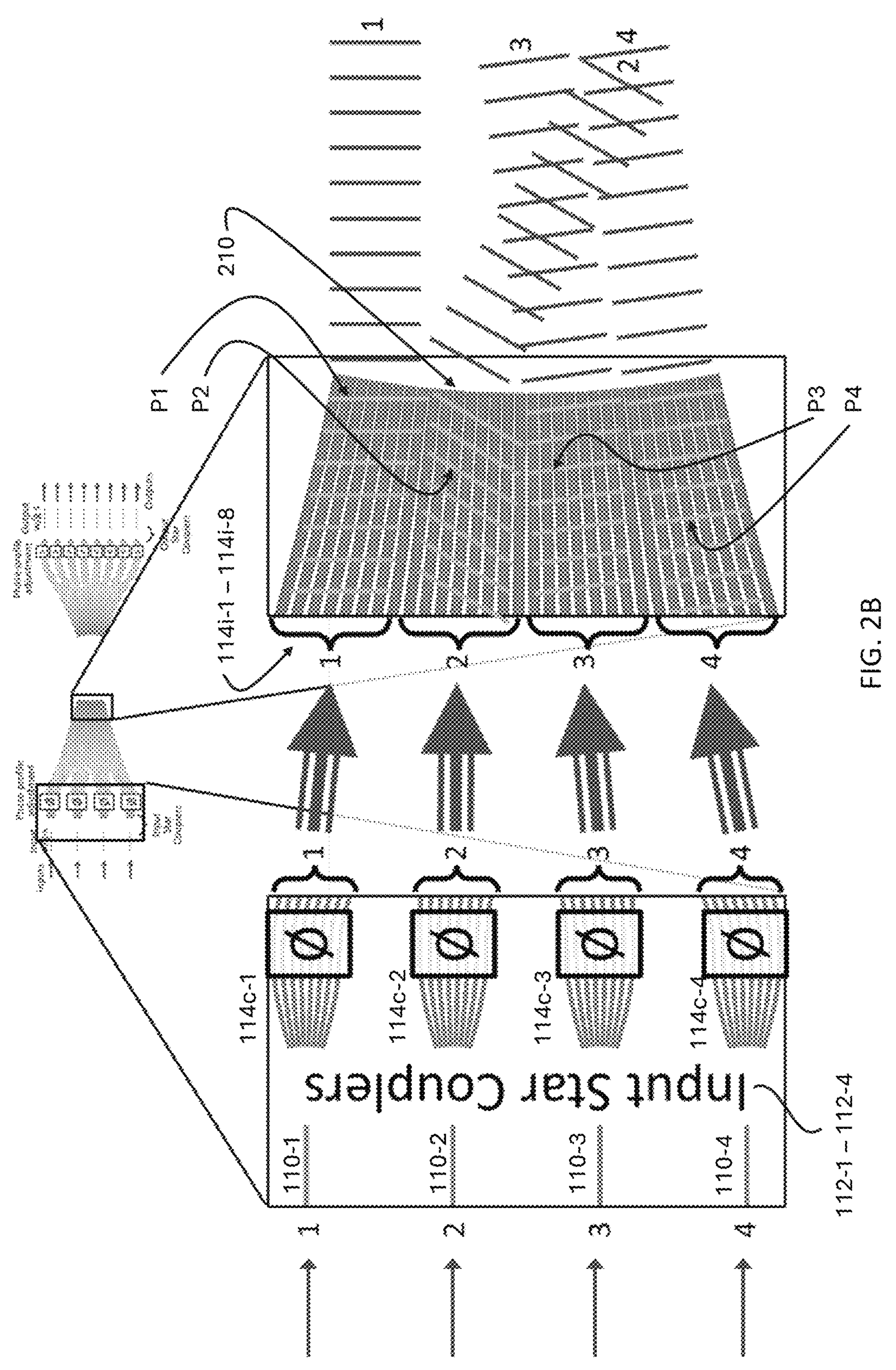
FIG. 2B shows an example of input light beams being routed through an interference region of the optical switch of FIG. 1, according to an example embodiment.
Figure 2C:
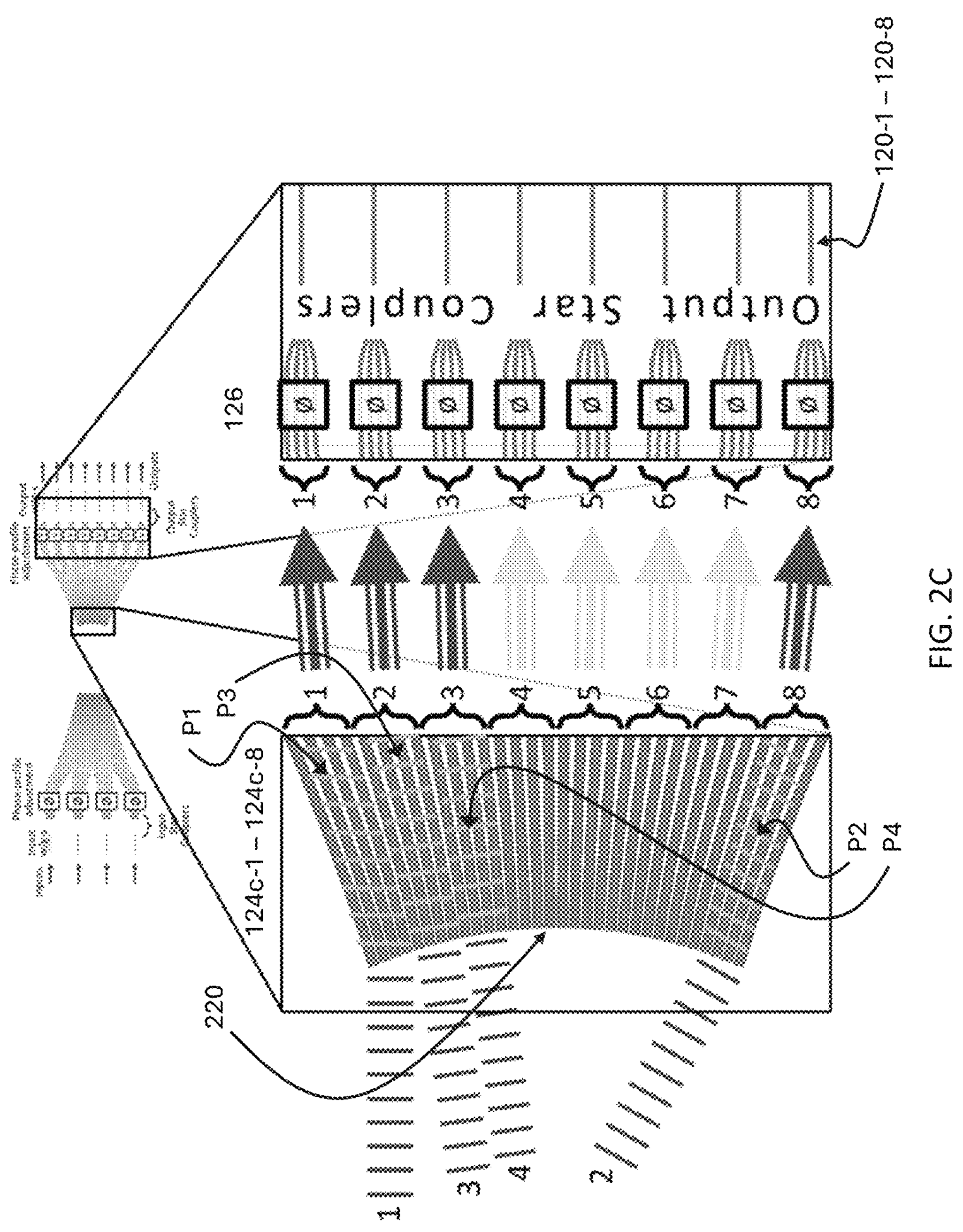
FIG. 2C shows an example of routed input light beams being received at an output aperture and routed to output waveguides of the optical switch of FIG. 1, according to an example embodiment.

FIGS. 2A-2C describe an example operation of the optical switch 100. FIG. 2A is a flow chart describing the propagation of light beams from the input end to the output end of the optical switch 100. FIG. 2B shows light beams propagating from the input waveguides 110 into the interference region 230 of the main star coupler 200. FIG. 2C shows the light path between the interference region 230 of the main star coupler 200 and the output waveguides 120. FIG. 2A describes a single input light beam and corresponding output light beam, but as can be seen from FIGS. 2B and 2C, and as described below, a plurality of input light beams can be input to a plurality of input waveguides 110 of the optical switch 100 simultaneously, and can be routed to a plurality of corresponding output waveguides 120 simultaneously.

In step 201, an input light beam is input to the input waveguide 110. For example, a light beam can be transmitted from an optical fiber or other medium to be incident on an entry end of an input waveguide 110. As shown in greater detail in FIG. 2B, light beam 1 is received by and passes through input waveguide 110-1, light beam 2 is received by and passes through input waveguide 110-2, light beam 3 is received by and passes through input waveguide 110-3, and light beam 4 is received by and passes through input waveguide 110-4.

In step 202, each input light beam is spread into a spread light beam, in a respective input star coupler 112-1 through 112-4. The spread light beam may be the same light beam carrying the same information as the input light beam, but may be spread. Next, in step 203, spread light from the input waveguide of the respective input star couplers 112-1 through 112-4 is received by respective groups of input-waveguide cores 114*i*, which may form a plurality of compound input waveguides 114*c*. In this manner, each of M input light beams is split N ways and enters M corresponding compound input waveguides 114*c*, each compound input waveguide including N input-waveguide cores 114*i*-1 through 114*i*-N. In the example of FIG. 2B, M=4 and N=8, but these numbers can vary depending on the switch and the desired number of inputs and outputs. In a case where a different device from star couplers are used, such as splitters, the light beam may be split into split light beams in step 202, and the split light may be received by groups of input-waveguide cores 114*i* in step 203.

In step 204, the light beam in each input-waveguide core 114*i*-1 through 114*i*-N for each compound input waveguide 114*c*-1 through 114*c*-M passes through a phase shifter 116, which shifts the phase of the light beam so that the light beams in each group of input-waveguide cores 114*i*-1 through 114*i*-N have a desired phase profile. For example, there can be N×M total phase shifters 116, and for each compound input waveguide 114*c*-1 through 114*c*-M, each phase shifter can adjust the phase of the light passing therethrough in sequential increments to cause different phase profiles. For example, the flat phase profiles prior to the light beams passing through the phase shifters 116 are modified by the phase shifters, which retard or advance the phase in each core input waveguide 114*c* forming the multi-core compound input waveguides 114*i*. The phase shifters 116 can be externally and independently controlled to allow for individual phase adjustments.

In step 205, the light beams from the plurality of input-waveguide cores 114*i* enter the interference region 230 through the input aperture 210. In the example of FIG. 2B, as a result of steps 204 and 205, the phases in the input-waveguide cores of compound input waveguide 114*c*-1, as indicated with a series of lines across the waveguide labeled P1, are adjusted so as to direct beam 1 horizontally after beam 1 passes through the input aperture 210. The phase profile in compound input waveguide 114*c*-2, as indicated with a series of lines across the waveguide labeled P2, is tilted to the right and directs the corresponding beam 2 diagonally down. Phase profiles in compound waveguides 114*c*-3 and 114*c*-4, as indicated with lines P3 and P4, are tilted slightly left, and direct the corresponding beams 3 and 4 slightly up. Thus, the different beams 1-4 can be redirected within the main star coupler 200 to desired locations on the output aperture 220 of the main star coupler 200. It should be noted that the various figures show a top-down layout view of the optical switch 100 or 100'.

In addition to redirecting the light beams, the phase adjustment made by the phase shifters 116, in combination with the curvature of the waveguide-facet placement at the input aperture 210 of the main star coupler 200, and the corresponding curvature and location of the output aperture 220 and precise location of the terminal ends of the output-waveguide cores 124*i* at the output aperture 220, focuses the beams produced by the multi-core compound input waveguides 114*c*-1 through 114*c*-4. For example, for each input light beam 1-4, the diffraction-limited spot size at the output aperture 220 of the star coupler 200 matches the size of the compound output waveguide 124*c* termination at the output aperture 220. For example, the light beam reaching the output aperture 220 may have a lateral extent that matches the lateral extent of the terminal end of the compound output waveguide 124*c* at the output aperture 220. This match may be assured by the star-coupler design, which, when used conventionally, focuses a beam with a flat phase profile at the input into a single core waveguide at the output. As a result of the embodiment depicted in FIGS. 1 and 2A-2C, a light beam produced by an aperture ¼ the size of the overall aperture (e.g., one of the 4 multi-core compound input waveguides) focuses to a spot four times the size and therefore can illuminate four output-waveguide cores-exactly the size of one of the multi-core compound output waveguides 124*c*.

This mathematical relationship carries over to other sizes of the main star coupler and numbers of input waveguides and output waveguides. For example, a star coupler may have M×N waveguide cores at the input and at the output. The input waveguide cores may be divided into M groups (e.g., M multi-core compound input waveguides) with N waveguide cores in each group. The aperture of each compound input waveguide at the star-coupler input is 1/M the size of the aperture of the entire star coupler input. Therefore, the diffraction-limited spot size of the beam produced by the compound input waveguide is a factor of M larger than the diffraction-limited spot size produced by the entire input aperture of the star coupler. Such a spot illuminates M output waveguide cores-assuming that the star coupler is designed so that the diffraction-limited spot of the entire input aperture is the size of one output-waveguide core. As a result, a group of M output-waveguide cores, combined to an M-core output compound waveguide, captures the beam produced by an N-core compound input waveguide.

Continuing with FIG. 2A, at step 206, light from the interference region is received by the output-waveguide cores 124*i*, for example, at the output aperture 220 of the main star coupler 200. As mentioned above, the light may be a focused and directed light, having a focused spot size at the output aperture 220 that covers a particular number of output-waveguide cores 124*i*, such as a group of output-waveguide cores 124*i* that forms a compound output waveguide 124*c*. Each compound output waveguide 124*c* may comprise a portion of the output aperture 220 and may include a plurality of output-waveguide cores 124*i* arranged in a particular manner, so that a light beam focused on the plurality of output-waveguide cores 124*i* and having a specific direction will be collected from the main star coupler 200 by the compound output waveguide 124*c* and will be propagated through the compound output waveguide 124*c* to a corresponding output star coupler 122.

In step 207, phase adjustment is performed for each output-waveguide core 124*i* by the phase shifters 126. Types of phase shifters can be selected from the types of phase shifters already discussed previously, and control of the phase shifters 126 can be from an external source and can include independent control of each phase shifter 126. The phase shifters 126 for the output-waveguide cores 124*i* of each compound output waveguide 124*c* may be configured to flatten the phase profile of the light beams passing therethrough, so that light output at the exit ends of the output-waveguide cores 124*i* for each compound output waveguide 124*c* is in phase. In step 208, the in-phase light beams are focused, for example, by a plurality of output star couplers 122, so that the light properly focuses on the entry end of respective output waveguides 120 (step 208).

Then, in step 209, the light collected by each output waveguide 120 is output by the waveguide 120 from the optical switch 100. As a result of the above steps, input phase shifters 116 determine where the incoming beams are directed when entering the main star coupler 200, and output phase shifters 126 determine which light is going to be focused on the corresponding output waveguides 120 by selecting light only from particular directions to be focused on the corresponding output waveguides 120.

According to the method of FIG. 2A, light beams received at input waveguides of an optical switch from M input light beams can be re-routed through the optical switch to exit the switch at M selected output waveguides from a group of N total output waveguides, for N greater than or equal to M. For example, as shown in FIG. 2C, each of the light beams 1, 2, 3, and 4 passing through the interference region 230 of the star coupler 200 arrives at a particular location on the output aperture 220 and is focused at that location. The light is then collected by a compound output waveguide 124*c*, and has a particular phase profile, depicted as P1'-P4' in FIG. 2C. For example, the light beams labeled 1, 3, 4, and 2, are respectively collected by the compound output waveguides labeled 1, 2, 3, and 8 from among compound output waveguides 124*c*-1 through 124*c*-8. Each compound output waveguide that collects a light beam may include M output-waveguide cores 124*i*. The number M of output-waveguide cores 124*i* in each compound output waveguide 124*c* may be the same as the number M of initial received light beams 1-4. The different light beams in each compound output waveguide 124*c* having different phase profiles may have their phase profiles flattened by output phase shifters 126, such that the phase-flattened light beams may be passed through an output star coupler 122 and may be focused on an entry end of a respective output waveguide 120 of output waveguides 120-1 through 120-8. This way, the output star couplers 122, in combination with the output phase shifters 126, may serve as spatial filters that reject stray light that might have coupled to the multi-core compound output waveguides 124*c*. In the manner described above, each light beam entering an input waveguide 110 may be split among waveguide cores of the respective compound waveguide 114*c*, then phase-shifted to have a phase profile, then transmitted into an interference region 230 to result in a light profile, then collected by the output aperture 220, and then may be reconstructed via the output path between the output aperture 220 and a selected output waveguide 120, to be output at the selected output waveguide 120. As a result, the switch 100 may reroute the light beams 1-4 to 4 output waveguides selected from 8 output waveguides, as depicted in this example. However, other numbers of inputs and outputs may be used.

In order to change the routing of the input light beams to different output light paths, the input phase shifters 116 and output phase shifters 126 can be adjusted to adjust the phase profile of the associated light beams exiting the input-waveguide cores 114*i* at the input aperture 210, and to re-adjust the phase profile (e.g., flatten the phase profile) of the desired light beams entering the desired output waveguide 120. Such adjustments can be made, for example, using a computer including hardware and software for controlling the settings of the phase shifters. The adjustments can be made by a technician, or can be made automatically, for example, based on a pre-set computer program, or adjustments can be made both manually and automatically. For example, to route the input light beams to desired output waveguides 120, the output phase shifters 126 can be adjusted based on the characteristics of the input light beams 111, the characteristics of input star couplers 112, the input phase shifter 116 settings, the characteristics of the output star couplers 122, and the input aperture 210 and output aperture 220 configurations of the main star coupler 200, using known optics formulas and properties.

When implementing the optical switch in silicon-photonics technology, electronics controlling the phase adjustment may be combined with the photonic circuitry. Such a combination may reduce the number of I/O connectors necessary to drive the switch and allow star couplers with potentially as many as 1000 waveguides at the input and at the output. This size of the star coupler would allow a practical implementation of the 10-by-100 switch discussed in the background section.

In addition to the embodiments described above, other embodiments and/or modes of operation may be used. For example, the phases of the input light beams may be adjusted at the compound input waveguides 114*c* so that the spot focused at the output aperture 220 of the main star coupler 200 straddles two or more compound output waveguides 114*c*. In another embodiment, amplitude adjustment may be added at the input waveguides 110, which would allow arbitrary addressing of multiple compound output waveguides 114*c*. In this case, for example, the main star-coupler's input facet at the input aperture 210 would effectively become a dynamic hologram. This feature may be particularly useful when using the optical switch 100 in combination with AB mapping (for example, as described in U.S. Pat. No. 11,855,692, which is hereby incorporated by reference in its entirety) to address arbitrary interstitial beams.

Notably, when directing the beams across the main star coupler 200, as described above in reference to FIGS. 1 through 2C, the phase adjustment with phase shifters 116 and 126 uses only one degree of freedom: Tilting the phase profile as, e.g., illustrated with lines P1 through P4 in FIG. 2B. This leads to M+N degrees of freedom in adjusting the state of the MASTR switch for switching and routing optical inputs to desired outputs. However, each of the input phase shifters 116 provide for N degrees of freedom (N=8 in the example of FIGS. 1 through 2C) and each of the output phase shifters 126 provide for M degrees of freedom (M=4 in the example of FIGS. 1 through 2C). This is because the phase in each core of each compound input waveguide 114*c* may be adjusted independently, as can the phase in each core of each compound output waveguide 124*c*. Therefore, the MASTR switch 100 provides for 2×M×N degrees of freedom in the adjustment of its state. Adding independent amplitude adjustment in each core of each compound waveguide would double the number of degrees of freedom determining the state of the MASTR switch. Such flexibility in setting the state of the MASTR switch offers tremendous flexibility to exploit its use in applications beyond the switching application described above. For example, the phases in one or more of the input phase shifters 116 may be set so as to broadcast the light emanating from the corresponding compound input waveguide 114*c* to two or more compound output waveguides 124*c*.

FIGS. 3, 4*a*-4*d*, and 5*a*-5*d* depict an alternate embodiment, in which the input-waveguide cores 114*i* and output-waveguide cores 124*i* are grouped into different groups to select which output waveguides 120 should receive which light beams input to the input-waveguide cores 114*i*. Differences between this embodiment and the embodiment of FIG. 1 may mainly described, and details the same as, or similar to, certain features described in connection with FIG. 1 may be omitted for the sake of brevity.

Similar to FIG. 1, the optical switch 100' of FIG. 3 has a plurality of input waveguides 110, a plurality of input star couplers 112, a plurality of input-waveguide cores 114*i'*, a plurality of input phase shifters 116, a plurality of output waveguides 120, a plurality of output star couplers 122, a plurality of output-waveguide cores 124*i'*, a plurality of output phase shifters 126, and a main star coupler 200. The main layout difference between the embodiment of FIG. 1 and the embodiment of FIG. 3 is the placement and arrangement of the exit ends of the input-waveguide cores 114*i'* and the output-waveguide cores 124*i'* in the input aperture 210 and the output aperture 220.

In the embodiment of FIG. 3, after phase adjustment, the input-waveguide cores 114*i'* of each compound waveguide 114*c'* are evenly distributed across the input aperture 210 of the main star coupler. Input-waveguide cores 114*i'* for different compound input waveguides 114*c'* may be interleaved with each other, to have alternatingly arranged exit terminal ends at the input aperture 210 of the main star coupler 200. In this manner, the group of input-waveguide cores 114*i'* that make up a compound input waveguide 114*c'* may not employ phase adjustment to result in a beam directed through the interference region 230 toward a particular single spot at the output aperture 220. Instead, the distribution of the input-waveguide cores 114*i'* across the input aperture 210 of the main star coupler 200 serves to effectively create a diffraction grating, which generates fringes, or multiple spots regularly distributed at the output aperture 220, which are collected by the output-waveguide cores 124*i'*. The position of these fringes on the output aperture 220 shifts as a function the phase tilt, or blaze, applied by the phase shifters 116 across the respective compound input waveguide 114*c'*; more details are provided below.

Therefore, at the output aperture 220, output-waveguide cores 124*i'* from different compound output waveguides 124*c'* are interleaved with each other to be distributed across part of the output aperture 220. The even spacing of the input-waveguide cores 114*i'* at the input aperture 210 causes even spacing of the fringes at the output aperture 220, and the separation of the input-waveguide cores 114*i'* at the input aperture 210 defines the fringe separation at the output aperture 220. In addition, in one embodiment, applying a phase blaze profile across the input-waveguide cores 114*i'* of a compound input waveguide 114*c'* steers the position of the fringes at the output aperture 220. Phase blaze profile is understood as phase profile where the optical-phase difference between adjacent cores of a compound waveguide is the same for all adjacent pairs in the compound waveguide. As a result, matching spacing of the terminal ends of the output-waveguide cores 124*i'* of the compound output waveguides 124*c'* to the spacing of the diffraction fringes allows for the collection of the light output by a corresponding compound input waveguide 114*c'*, as long as the phase profile of the light beams exiting the compound input waveguide 114*c'* is set/adjusted to shift the fringes so that they land on the desired output-waveguide core 124*c'* terminal ends. The phase adjustment to shift the fringes may be applied independently to each compound input waveguide 114*c'* thereby steering their outputs to the desired output-waveguide cores 124*i'* of the selected compound output waveguide 124*c'*.

At the output aperture 220 of the main star coupler 200, the output-waveguide cores 124*i*' are gathered from across the entire aperture to form the individual compound output waveguides 124*c*'. The individual compound output waveguides 124*c*' then undergo phase adjustment and the outputs from the output phase shifters 126 are coupled through the respective output star couplers 122 to the corresponding output waveguide 120.

Using the optical switch 100' of FIG. 3, routing selection of multiple input light beams may be performed simultaneously to multiple selected output waveguides. The embodiment of FIG. 3 may result in better isolation between channels than the embodiment of FIG. 1.

FIGS. 4*a* through 4*d* highlight the input-waveguide cores 114*i*' of the individual compound input waveguides 114*c*' to show their positions at the input aperture to the main star coupler 200. Note that in each case, for each compound input waveguide 114*c*' coupled to a respective input waveguide 110, (1) the input-waveguide cores 114*i*' are evenly spaced at the input aperture 210, and (2) the input-waveguide cores 114*i*' are spread across to cover most of the input aperture 210.

FIGS. 5*a*-5*d* show examples of different phase adjustments in the second input compound input waveguide 114*c*-2' to send the light beam to one of the compound output waveguides. In this optical switch configuration, the eight input-waveguide cores 114*i*' of each compound input waveguide 114*c*' generate four fringes at the output aperture 220 of the main star coupler 200. The location of the four fringes can be selected based on the phase profile of the light beams exiting the eight input-waveguide cores 114*i*' of each compound input waveguide 114*c*'. To collect the four fringes, the compound output waveguides 114*c*' comprise four output-waveguide cores 114*i*' each, evenly distributed over the output aperture 220 and interleaved with output-waveguide cores 114*i*' of other compound output waveguides 114*c*'. Subsequently, the phase adjustment by the output phase shifters 126 serve to focus the desired signal onto the output waveguides 120.

The above embodiments may be implemented using a photonic integrated circuit (PIC) including the optical switch described herein. The PIC may include the optical components of the optical switch described above, as well as some electronic circuitry for controlling the input phase shifters 116 and output phase shifters 126. The PIC may be used in various fields, such as telecommunications as a routing point to route a number of M communications (e.g., wireless or optical signals) received at a telecommunications node to a selected M destination nodes, where M is an integer of 1 or more.

MASTR Switch as a Universal Beamformer

The configuration and operation of a MASTR switch may be generalized in at least two ways. First, arbitrary phase profiles may be effected by the input and output phase shifters 116 and 126 rather than limiting the phase profiles to blazed profiles. Amplitude adjustment may also be included in the adjustment in this situation. Second, the waveguides at the input and output apertures 210 and 220 of the main star coupler 200 may be arbitrarily permuted. FIGS. 1 and 3 show two possible permutations, with FIG. 1 depicting a trivial permutation that groups waveguide cores for each compound waveguide to be arranged in the same order and adjacent to each other both at the input and at the output apertures of the main star coupler, and with FIG. 3 depicting an interleaving permutation where one end of the compound waveguide has the waveguide cores arranged adjacent to each other, but another end has cores from different compound waveguides interleaved with each other. A total of (MN)! permutations may exist among MN waveguides at the input and at the output apertures of the main star coupler. FIG. 6 shows a diagram of such a generalized MASTR switch where the permutation at the input aperture may differ from the permutation at the output aperture of the main star coupler. The diagram also includes blocks representing phase and amplitude adjustments that are labeled "Complex-amplitude Adjustment." The complex-amplitude adjustment at the output may differ from the complex-amplitude adjustment at the input and may include the adjustment of the phase and of the amplitude of light in each of the waveguide cores.

The ability to arbitrarily adjust the complex amplitudes of the optical signals at the input and at the output may provide for the implementation of a more general matrix multiplication of the input to obtain the output. For example, the complex-amplitude setting at the cores of input 1 may determine what fraction of the overall optical input power entering this input is directed towards the cores of output 1 waveguide, output 2 waveguide, output 3 waveguide, etc. Similarly for input 2, input 3, etc. The phases and amplitudes in the output cores may then be adjusted to direct the incoming light to the output waveguide. As a result, an arbitrary matrix multiplication, up to an overall scaling factor, may be applied to the vector represented by optical signals launched at the input waveguides.

The matrix multiplication happens in analog domain with very low latency determined by the length of the device performing the matrix multiplication. For example, if the device is about 1 cm in length, and is patterned in silicon with the refractive index of about 3, the latency of matrix multiplication would be about 100 ps. The number of matrix-vector multiplications per second is limited by the speed at which the complex amplitudes may be adjusted. Implementation of the device in lithium niobate, which may be used to fabricate modulators responding to frequencies exceeding 100 GHz, would allow 100 billion matrix-vector multiplications per second or more in a single device. Furthermore, multiple different vectors may be encoded in different wavelengths and multiplied by the same matrix simultaneously. Such wavelength-division multiplexing of matrix-vector multiplication may accordingly increase the number of operations per second.

The functionality of complex-amplitude may be also accomplished by increasing the number of waveguides at the input aperture of the main star coupler versus its output aperture, as illustrated in FIG. 7. In this case, the fraction of light that is meant not to end up in one of the output waveguides may be directed to the portion of the output aperture that is terminated. For example, the phase profile in the cores of input 1 may be adjusted to direct a fraction of the overall optical input power entering this input towards the cores of output 1 waveguide, output 2 waveguide, output 3 waveguide, etc. and to direct the remaining fraction toward output-aperture waveguides that are terminated. Similarly for input 2, 3, etc. As a result, the overall device is simplified since only phase adjustment is needed to achieve the desired functionality rather than phase-and-amplitude adjustment of FIG. 7. A terminated output-aperture waveguide, or core, may include light-absorbing material to dissipate light entering it. Such material may include doped semiconductor, such as n-doped silicon or p-doped silicon. Alternatively, or in combination, a terminated output-aperture waveguide may allow light entering it to spread in the medium without capturing it. In other embodiments, the terminated output-aperture waveguide may include a coupling structure to couple the light out of the PIC.

The optical switch described herein may be used to implement arbitrary matrix multiplication in the optical domain. The inputs are organized in a vector and so are the outputs. In the example provided above, the input vector resides in a four-dimensional space (four input signals) whereas the output vector resides in an eight-dimensional space (eight output signals). Adjustment of the phase profile in each input compound waveguide may then be used to generate the desired distribution, both in amplitude and phase, of light across the output aperture. At the same time, the adjustment of phase profile in each output compound waveguide sets the (complex) weights (proportions) on light intensity accepted from the input waveguides. As a result, the output vector is a product of a matrix set by the phase adjustments and the input vector. If needed, amplitude adjustment, in addition to phase, may be introduced in each arm (core) of the MASTR switch.

The matrix multiplication happens literally at the speed of light—the latency is the time it takes light to traverse the device. Assuming that the total path length is of the order of 1 cm, and the refractive index is ~3, the latency may be ~100 ps. The number of multiplications per second may be limited only by the speed at which the signals are fed to the MASTR switch and read at the output. Furthermore, multiple matrix-vector multiplications could take place simultaneously by using several different wavelengths to encode several different data streams. In this case, the same matrix would multiply different vectors encoded in the different wavelengths. The data streams encoded in the different wavelengths may be combined at the input, and separated at the output, using, e.g., arrayed-waveguide grating (AWG).

Notably, matrix multiplication lies at the core of artificial intelligence (AI) and machine learning. Using MASTR switch for this purpose may reduce latency as compared to implementations presently investigated by several groups/companies that rely on an interconnected fabric of Mach-Zehnder-based 2×2 switches.

Another application of the optical switch described herein is in quantum information processing (quantum computing, quantum communication) where the matrix multiplication may be used as means to produce multipartite entanglement.

The optical matrix multiplication in an optical switch such as described herein may also be used directly for beam forming in optically-fed TX and RX phased arrays. This application is important for cases where the phased array is expected to produce not only directed beams (that are approximately plane waves in the vicinity of the array), but more general wave-fronts. Since the optical switch is capable of producing an arbitrary distribution of amplitudes and phases across the outputs from a single input, it can replicate in optical domain the desired wave-front to be transmitted from the TX array. Conversely, it may compensate for an arbitrary distribution of amplitudes and phases of a signal reaching the phased array and direct the signal to a single output. The optical switch may perform these operations simultaneously on multiple wave-fronts thereby 'connecting' in a non-blocking way the component wave-fronts on one side with designated ports on the other. As such, the optical switch may compensate for multi-path of signals reaching the phased array, and exploit diverse scattering environments to improve signal-to-noise ratio and channel separation. Notably, the processing is dimension agnostic, i.e., signals from a 2D phased array may be processed using a planar MASTR switch.

The optical switch, according to aspects of the disclosed embodiments, enables asymmetric switching between M input and N outputs in a PIC form factor where M and N may be different in general. Such switching is achieved in a 'single go' rather in an interconnection fabric of multiple smaller, e.g. 2×2, switches. In addition, conventional micro-fabrication technology may be used to fabricate the optical switch in quantity.

Terms such as "the same" or phrases such as "maintained to be the same" are intended to include minor variations that do not otherwise affect the operation of the system. The term "substantial" or "substantially" may be used to reflect this meaning.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

What is claimed is:

1. An optical switch comprising:
M input waveguides, M being an integer greater than 0;
N output waveguides, N being an integer greater than 0;
a plurality of input-waveguide cores coupled to the M input waveguides;
a plurality of input phase shifters respectively coupled to the plurality of input-waveguide cores;
a plurality of output-waveguide cores coupled to the N output waveguides;
a plurality of output phase shifters respectively coupled to the plurality of output-waveguide cores;
an input aperture at which the plurality of input-waveguide cores coupled to the M input waveguides terminate;
an output aperture at which the plurality of output-waveguide cores coupled to the N output waveguides terminate; and
an interference region between the input aperture and the output aperture;
wherein:
a first group of the plurality of input phase shifters is configured to provide a first phase profile of first light beams passing through a first group of the input-waveguide cores,
based on the first phase profile, a configuration of the input aperture, a configuration of the output aperture, interference that occurs in the interference region, and first settings of a first group of the output phase shifters, a light beam that passes through a first input waveguide of the M input waveguides is routed to a first output waveguide of the N output waveguides.

2. The optical switch of claim 1, wherein:
the first group of the plurality of input phase shifters is further configured to provide a second phase profile of second light beams passing through the first group of the input-waveguide cores, and
based on the second phase profile, the configuration of the input aperture, the configuration of the output aperture, interference that occurs in the interference region, and second settings of the first group of the output phase shifters, a light beam that passes through the first input waveguide of the M input waveguides is routed to a second output waveguide of the N output waveguides, the second output waveguide different from the first output waveguide.

3. The optical switch of claim 2, wherein:

a second group of the plurality of input phase shifters is configured to provide a third phase profile of third light beams passing through a second group of the input-waveguide cores, and to provide a fourth phase profile of fourth light beams passing through the second group of the input-waveguide cores, based on the third phase profile, the configuration of the input aperture, the configuration of the output aperture, interference that occurs in the interference region, and third settings of a second group of the output phase shifters, a light beam that passes through a second input waveguide of the M input waveguides is routed to the first output waveguide of the N output waveguides, and based on the fourth phase profile, the configuration of the input aperture, the configuration of the output aperture, interference that occurs in the interference region, and fourth settings of the second group of the output phase shifters, a light beam that passes through the second input waveguide of the M input waveguides is routed to a third output waveguide of the N output waveguides, the third output waveguide different from the first output waveguide and the second output waveguide.

4. The optical switch of claim 3, wherein:

when the first group of the plurality of input phase shifters provides the first phase profile of first light beams passing through the first group of the input-waveguide cores and the first group of the output phase shifters has the first settings, and the second group of the plurality of input phase shifters provides the fourth phase profile of fourth light beams passing through the second group of the input-waveguide cores and the second group of the output phase shifters has the fourth settings, when a first light beam passes through the first input waveguide of the M input waveguides and, simultaneously, a second light beam passes through the second input waveguide of the M input waveguides, the first light beam is routed to the first output waveguide via the interference region at the same time that the second light beam is routed to the third output waveguide via the interference region.

5. The optical switch of claim 1, further comprising:

M groups of input-waveguide cores of the plurality of input-waveguide cores, each group:

having a particular arrangement of terminal ends at the input aperture, forming a compound input waveguide, and coupled to a respective group of input phase shifters configured to provide a phase profile for light beams passing through the group of input-waveguide cores, wherein the first group of the input-waveguide cores is one of the M groups of input-waveguide cores.

6. The optical switch of claim 5, wherein:

the particular arrangement of terminal ends includes terminal ends for each group of input-waveguide cores being adjacent to each other.

7. The optical switch of claim 5, wherein:

the particular arrangement of terminal ends includes interleaving terminal ends of input-waveguide cores for each compound input waveguide with terminal ends of input-waveguide cores for other compound input waveguides.

8. The optical switch of claim 1, wherein:

the plurality of input phase shifters are individually controllable to adjust the phase of the light passing through the respective input-waveguide cores; and the plurality of output phase shifters are individually controllable to adjust the phase of the light passing through the respective output-waveguide cores.

9. The optical switch of claim 1, wherein M is different from N.

10. A method of selecting at least a first optical output path for at least a first optical input signal, the method comprising:

inputting the first optical input signal into a first plurality of input waveguide cores, so that a light beam of the first optical input signal passes through each input waveguide core of the first plurality of input waveguide cores simultaneously;

adjusting the phase of each light beam in each input waveguide core of the first plurality of input waveguide cores to result in a phase profile for the light beams passing through the first plurality of input waveguide cores;

transmitting the light beams having the phase profile through an input aperture formed at least in part by terminal ends of the first plurality of input waveguide cores and into an interference space to result in light having an interference profile;

collecting the light having the interference profile at an output aperture formed at least in part by terminal ends of a first plurality of output waveguide cores, thereby passing a light beam through each output waveguide core of the first plurality of output waveguide cores;

adjusting the phase of the light beam in each of output waveguide cores of the first plurality of output waveguide cores; and combining the light beams from the output waveguide cores of the first plurality of output waveguide cores to form a first combined light beam, and inputting the first combined light beam to a first output waveguide, wherein the adjusting of the phase of each light beam in each input waveguide core of the first plurality of input waveguide cores and the adjusting of the phase of the light beam in each of output waveguide cores of the first plurality of output waveguide cores is controlled to select the first output waveguide for routing the first optical signal.

11. The method of claim 10, wherein the interference profile is one of a light pattern or a light beam direction.

12. The method of claim 10, wherein the method is performed by an optical switch, the optical switch comprising:

M input waveguides, wherein the first optical input signal is received from a first input waveguide of the M input waveguides, the M input waveguides comprising all of the input waveguides of the optical switch, and M being an integer greater than 0; and N output waveguides comprising all of the output waveguides of the switch, the N output waveguides including the first output waveguide, N being an integer greater than 0 and different from M.

13. The method of claim 10, further comprising:

selecting a second optical output path for a second optical input signal including:

inputting the second optical input signal into a second plurality of input waveguide cores at the same time as inputting the first optical input signal into the first plurality of input waveguide cores, so that a light beam of the second optical input signal simultaneously passes through each input waveguide core of the second plurality of input waveguide cores;

adjusting the phase of each light beam in each input waveguide core of the second plurality of input waveguide cores to result in a phase profile for the light beams passing through the second plurality of input waveguide cores;

transmitting the light beams having the phase profile through the input aperture, which is additionally formed at least in part by terminal ends of the second plurality of input waveguide cores and into the interference space, to result in additional light having an additional interference profile;

collecting the additional light having the additional interference profile at the output aperture by terminal ends of a second plurality of output waveguide cores, thereby passing a light beam through each output waveguide core of the second plurality of output waveguide cores, at the same time as collecting the light having the interference profile at the output aperture by the terminal ends of the first plurality of output waveguide cores;

adjusting the phase of the light beam in each of output waveguide cores of the second plurality of output waveguide cores; and combining the light beams from the output waveguide cores of the second plurality of output waveguide cores to form a second combined light beam, and inputting the second combined light beam to a second output waveguide, wherein the adjusting of the phase of each light beam in each input waveguide core of the second plurality of input waveguide cores and the adjusting of the phase of the light beam in each of output waveguide cores of the second plurality of output waveguide cores is controlled to select the second output waveguide for routing the second optical input signal.

14. The method of claim 10, further comprising:

subsequent to inputting the first optical input signal into the first plurality of input waveguide cores, inputting a second optical input signal into the first plurality of input waveguide cores, so that a light beam of the second optical input signal passes through each input waveguide core of the first plurality of input waveguide cores simultaneously;

for the light beam of the second optical input signal:

adjusting the phase of each light beam in each input waveguide core of the first plurality of input waveguide cores to result in a phase profile for the light beams passing through the first plurality of input waveguide cores;

transmitting the light beams having the phase profile through an input aperture formed at least in part by terminal ends of the first plurality of input waveguide cores and into an interference space to result in light having an interference profile;

collecting the light having the interference profile at the output aperture, which is additionally formed at least in part by terminal ends of a second plurality of output waveguide cores different from the first plurality of output waveguide cores, thereby passing a light beam through each output waveguide core of the second plurality of output waveguide cores;

adjusting the phase of the light beam in each of output waveguide cores of the second plurality of output waveguide cores; and combining the light beams from the output waveguide cores of the second plurality of output waveguide cores to form a second combined light beam, and inputting the second combined light beam to a second output waveguide, wherein the adjusting of the phase of each light beam in each input waveguide core of the first plurality of input waveguide cores and the adjusting of the phase of the light beam in each of output waveguide cores of the second plurality of output waveguide cores is controlled to select the second output waveguide for routing the second optical signal.

15. An optical switch comprising:

M input waveguides, M being an integer greater than 0;

N output waveguides, N being an integer greater than 0;

a plurality of input-waveguide cores coupled to the M input waveguides, so that N input-waveguide cores that form a compound input waveguide are coupled to each input waveguide and each input-waveguide core is configured to receive a light beam output from the input waveguide to which it is coupled;

a plurality of input phase shifters, each input phase shifter coupled to a corresponding input-waveguide core and configured to be controllable to adjust a phase of a light beam passing through the corresponding input-waveguide core;

a first aperture through which light beams exiting the plurality of input-waveguide cores pass;

an interference space where the light beams exiting the plurality of input-waveguide cores interfere with each other;

a second aperture configured to receive light having a particular light profile from the interference space and at which a plurality of entry ends of a plurality of output-waveguide cores are located, the output-waveguide cores grouped into N groups, each group comprising a compound output waveguide;

a plurality of output phase shifters each output phase shifter coupled to a corresponding output-waveguide core and configured to be controllable to adjust a phase of a light beam passing through the corresponding output-waveguide core, wherein exit ends of the output-waveguide cores for each compound output waveguide are coupled to a corresponding output waveguide; and a controller configured to control the input phase shifters and the output phase shifters in order to simultaneously route a plurality of light beams received by k of the M input waveguides to k of the N output waveguides, k being an integer greater than 0.

16. The optical switch of claim 15, wherein N is different from M.

17. The optical switch of claim 15, wherein each of the plurality of input phase shifters is independently controllable to control the phase of the light passing through a corresponding input-waveguide core, and each of the plurality of output phase shifters is independently controllable to control the phase of the light passing through a corresponding output-waveguide core.

18. The optical switch of claim 17, wherein settings of the input phase shifters are configured to be changed in order to change a location of a spot of light or a location of peaks of light at the second aperture.

* * * * *